United States Patent
Rigney et al.

(10) Patent No.: US 7,231,778 B2
(45) Date of Patent: Jun. 19, 2007

(54) COOLING SYSTEM FOR A COMMERCIAL AIRCRAFT GALLEY

(75) Inventors: Richard N. Rigney, Las Vegas, NV (US); Ian D. Oswald, Santa Ana, CA (US)

(73) Assignee: BE Intellectual Property, Inc., Wellington, FL (US)

( * ) Notice: Subject to any disclaimer, the term of this patent is extended or adjusted under 35 U.S.C. 154(b) by 478 days.

(21) Appl. No.: 10/812,851

(22) Filed: Mar. 29, 2004

(65) Prior Publication Data

US 2005/0210910 A1    Sep. 29, 2005

(51) Int. Cl.
*F25D 17/04* (2006.01)
(52) U.S. Cl. .......................................... 62/407; 62/434
(58) Field of Classification Search ................ 62/185, 62/237, 430, 434, 407; 244/118.5
See application file for complete search history.

(56) References Cited

U.S. PATENT DOCUMENTS

| | | |
|---|---|---|
| 2,779,171 A | 1/1957 | Lindenblad |
| 3,216,215 A | 11/1965 | Schuett |
| 4,890,463 A | 1/1990 | Cantoni |
| 5,052,472 A | 10/1991 | Takahashi et al. |
| 5,265,437 A | 11/1993 | Saperstein et al. |
| 5,369,960 A | 12/1994 | Mueller et al. |
| 5,491,979 A | 2/1996 | Kull et al. |
| 5,496,000 A | 3/1996 | Mueller |
| 5,513,500 A | 5/1996 | Fischer et al. |
| 6,014,866 A | 1/2000 | Durham |
| 2003/0042361 A1* | 3/2003 | Simadiris et al. ........ 244/118.5 |

* cited by examiner

*Primary Examiner*—Melvin Jones
(74) *Attorney, Agent, or Firm*—Fulwider Patton LLP

(57) ABSTRACT

In the improved cooling system for a commercial aircraft galley, heat is transferred from a galley food cart by a point-of-use heat exchange system to a liquid cooled condenser. Liquid coolant for the liquid cooled condenser is circulated in a liquid coolant loop to a heat exchanger expelling heat for cooling the liquid coolant. The liquid coolant may be water or a mixture of water and glycol. A flow of cooling air from a heat exchanger cooled by the liquid cooled condenser is cycled through an air over system, through an air through system, or from a thermal convection air cooling system providing at least one cooled galley food cart surface to provide cooling. Heat may be transferred from a plurality of galley food carts to the circulating liquid coolant.

72 Claims, 14 Drawing Sheets

COOLING SYSTEM FOR A COMMERCIAL AIRCRAFT GALLEY

BACKGROUND OF THE INVENTION

1. Field of the Invention

This invention relates to transport aircraft galley systems, and more particularly, to systems to cool food carts prior to service by the cabin attendants.

2. General Background and State of the Art

Aircraft galley systems for modern transport aircraft incorporate food carts which are cooled to prevent food spoilage prior to use by the cabin attendants for distribution of food to the passengers. These food carts have in the past been interfaced with cold air supply systems in the galley designed to cool the interiors of the food carts. Such cool air distribution systems were generally co-located with the balance of the galley and interface with the food carts by means of gaskets connecting the food carts to a plenum providing the cool air. Conventional galley refrigeration systems typically utilize self contained air chillers which provide the cooled air directly to the food carts or refrigerated compartments. Such air chillers are typically installed above, below or otherwise within close proximity of the galley, and deliver cooled air via air ducts.

Chilling systems with remotely located liquid chillers have been developed that chill a heat transfer liquid that enters galley air cooling system devices, where heat is transferred from the compartment air to the liquid. However, since a cooled liquid is circulated, the liquid bus must be carefully insulated. As space in modern aircraft has become more at a premium and more efficient means of cooling the carts has become necessary, there has emerged a need for more efficient alternatives to such systems. Furthermore, recent FDA rulings have lowered the required temperature at which the interior of the food carts has to be kept in order to prevent food spoilage. It is important that any system that interfaces with either food or the cabin area can be configured to provide a wide range of cooling capacity as a function of the food and food carts that are to be interfaced with such a system.

Additionally, it has become more desirable to remove refrigeration equipment from the galley compartment and to find other means to properly cool the food carts without locating the entire refrigeration system in the galley area. In order to be compatible with modern transport aircraft requirements, it has become important to have an increased degree of safety and modularity for any aircraft system incorporating electronics or electric pumps, and it would be particularly desirable to locate at least a portion of such systems outside of the cabin area of the aircraft. In any event, it is important that any system that interfaces with either food or the cabin area is non-toxic and can be configured to provide a wide range of cooling capacity as a function of the food and food carts that are to be interfaced with such a system.

Aircraft air chillers are typically rated for operation at ambient temperatures of 85° F., and are capable of operating for short periods of time at ambient temperatures of up to 130° F. However, above 85° F., ambient refrigeration capacity decreases, and at 130° F., ambient refrigeration capacity is reduced approximately 60 percent. In addition, when the air chillers are not mounted within the cabin of an aircraft, the air chillers commonly do not provide adequate condenser airflow and cooling efficiency when the aircraft are on the ground in hot ambient temperatures, producing high condenser inlet temperatures. Furthermore, high operating temperatures that can occur under such conditions typically lead to higher failure rates and premature wear.

While one solution to the problem of providing adequate cooling at such elevated temperatures would be to provide an air chiller with a higher cooling capacity that would be adequate at these elevated temperatures, this would result in a significantly heavier air chiller unit which would be unacceptable for use in aircraft, and which would consume more power and would be considerably more expensive. A concomitant problem of providing such a higher capacity air chilling unit would be the requirement of removing an increased condenser airflow.

The present invention satisfies these and other requirements for aircraft galley systems.

INVENTION SUMMARY

Briefly, and in general terms, the invention provides for an improved point-of-use galley cooling method and system for cooling food in a commercial aircraft galley. In one embodiment, the galley cooling system is typically mounted in a galley cabinet, so that cool air is discharged from the galley cooling system and circulates over or through food carts in a galley cabinet to return to the galley cooling system to again be cooled and discharged. In another embodiment, the food in the aircraft galley can be directly cooled by cold plates cooled by the galley cooling system. In the method and system of the invention, heat is transferred from a galley food cart by a point-of-use heat exchange system to a liquid cooled condenser, liquid coolant is circulated through the liquid cooled condenser to remove heat from the liquid cooled condenser, the liquid coolant is circulated from the liquid cooled condenser in a liquid coolant loop to a heat expelling heat exchanger expelling heat to a heat sink for cooling the liquid coolant, and cooled liquid coolant is circulated in the liquid coolant loop to the liquid cooled condenser, and wherein the liquid coolant is maintained at a temperature from about 15° F. to about 30° F. above a temperature of the heat sink. The galley cooling system is a complete refrigeration system, which requires only electrical power, control signals, and a liquid to cool a condenser of the galley cooling system.

In a first embodiment, the present invention accordingly provides for a galley cooling system that circulates cooling air to cool an aircraft galley. The galley cooling system includes a housing providing a mounting plate and an enclosure with one or more vents, such as left and right side vents, for receiving air from the aircraft galley, a compressor motor mounted to the housing for compressing a refrigerant coolant, and a liquid cooled condenser mounted to the housing for receiving and cooling the refrigerant coolant from the compressor motor. An expansion valve mounted to the housing receives cooled refrigerant coolant from the condenser, and one or more evaporator units disposed within the housing receive the cooled refrigerant coolant from the expansion valve. Warmed refrigerant coolant from the one or more evaporator units is returned to the compressor motor. In a preferred aspect, first and second evaporator units are connected in series. An impeller connected to the housing draws air from the aircraft galley into the housing of the galley cooling system through the one or more vents to circulate the air from the aircraft galley over the one or more evaporator units to cool the air. A discharge means receives cooled air from the impeller means and discharges the cooled air into the aircraft galley.

In one presently preferred aspect, the discharge means includes a volute receiving air from the impeller, and a discharge funnel extending outside of the enclosure of the housing and connected to the volute discharges cold air from the volute through a plurality of cooling air discharge ports for providing a flow of cooling air over at least one food cart in a galley cabinet.

In another presently preferred aspect, the galley cooling system includes a sight glass connected to a refrigerant coolant duct connected to the condenser for viewing the condition of the refrigerant coolant exiting the condenser. A filter and dryer unit may also be connected to receive refrigerant coolant for filtering and removing water from the refrigerant coolant. The galley cooling system also typically includes a compressor motor access opening in the housing, and a compressor motor maintenance cover mounted to the housing over the compressor motor access opening to provide access to the compressor motor. Similarly, the housing may include a sight glass access opening, and a sight glass cover mounted to the housing over the sight glass access opening to provide access for viewing the sight glass, as well as a filter/dryer access opening in the housing, and a filter/dryer maintenance cover mounted to the housing over the filter/dryer access opening to provide access to the filter and dryer unit. The access openings and maintenance covers may be provided in the enclosure portion of the housing, or in the mounting plate.

In another presently preferred aspect, the condenser includes an inlet and an outlet for the refrigerant coolant, a central duct connected between the inlet and the outlet, an outer cooling jacket portion disposed over at least a portion of the central duct for cooling compressed refrigerant coolant which is conducted through the central duct of the condenser. The outer cooling jacket is connected to a liquid entry duct which receives a flow of a cooling liquid, such as water, for example. Typically, the cooled refrigerant coolant is condensed to a liquid phase in the condenser.

In another presently preferred aspect, the galley cooling system includes an electrical power supply connected to supply electrical power to the compressor motor and to the impeller means. The electrical power supply typically has an input connector for receiving electrical power and electrical control signals for controlling the operation of the galley cooler.

In another aspect, the galley cooling system housing includes a drain pan for collection of condensation from the housing of the galley cooler, and the drain pan includes a condensation drain for drainage from the drain pan.

In a presently preferred variant, an "air through" galley cooling system may be configured to supply cool air directly through galley food carts via gaskets connected to galley food cart ports, thereby cooling the galley cart contents directly. The galley cooling system can mounted in a galley cabinet, so that cool air is discharged from the galley cooling system and circulates within the galley cabinet to return to the galley cooling system to again be cooled and discharged.

In another presently preferred variant, the galley cooling system can be configured to provide "thermal convection" cooling directly to the galley food cart shelves and surfaces, thereby providing direct cooling to the food. The galley food cart shelves can have cooling air flowing through the shelves to remove heat.

In a second embodiment, the invention provides for a cooling system for use on aircraft, including one or more galley cooling units having a galley plenum and an evaporator within the galley plenum for conveying heat from the galley plenum to an intermediate working fluid, and one or more liquid condensing chiller subsystems remotely located with respect to the at least one galley cooling unit. The one or more liquid condensing chiller subsystems include one or more recirculation units receiving the intermediate working fluid from the evaporator to cool the intermediate working fluid, and the one or more recirculation units include a compressor connected in fluid communication with the evaporator for receiving the intermediate working fluid from the evaporator for compressing the intermediate working fluid, and a liquid cooled condenser connected in fluid communication with the compressor for receiving compressed intermediate working fluid from the compressor for cooling the intermediate working fluid, the liquid cooled condenser connected in fluid communication with the evaporator for returning the intermediate working fluid to the evaporator. The one or more liquid condensing chiller subsystems also include at one or more heat expelling heat exchangers connected in fluid communication with the liquid cooled condenser for receiving a liquid coolant from the liquid cooled condenser for cooling the chiller liquid and recirculating the liquid coolant to the liquid cooled condenser.

In one aspect, the galley plenum includes ducts in communication with the evaporator to direct a flow of air in thermal communication with the evaporator through the galley plenum for cooling the galley plenum, and the galley plenum may include a galley blower for directing the flow of air through the galley plenum. In another aspect, the liquid cooled condenser may be connected in fluid communication with the compressor by a non-insulated fluid bus or a non-insulated pipe. The one or more liquid condensing chiller subsystems may also include a heat exchanger receiving cooled intermediate working fluid from the liquid cooled condenser and connected between the evaporator and the compressor for cooling the intermediate working fluid communicated from the evaporator to the compressor.

The one or more liquid condensing chiller subsystems may further include a liquid control valve connected between the liquid cooled condenser and the evaporator for controlling flow of the intermediate working fluid to the evaporator, a sight glass connected between the liquid cooled condenser and the evaporator, a filter connected between the liquid cooled condenser and the evaporator, and an expansion valve connected between the liquid cooled condenser and the evaporator. The one or more liquid condensing chiller subsystems may also include a solenoid valve connected between the liquid cooled condenser and the evaporator. The one or more liquid condensing chiller subsystem may include a chiller liquid pump connected in fluid communication between the liquid cooled condenser and the one or more heat expelling heat exchangers for recirculating the chiller liquid from the heat expelling heat exchanger to the liquid cooled condenser. In one aspect, the chiller liquid may be water or a mixture of water and glycol. A controller unit is also provided that is operatively connected to the chiller liquid pump for controlling the operation of the chiller liquid pump. One or more temperature sensors may be connected to the controller unit and associated with the heat expelling heat exchanger, or the intermediate fluid downstream from the evaporator for sensing the temperature thereof. A fan may also be provided for drawing ambient air across the one or more heat expelling heat exchangers for cooling the one or more heat expelling heat exchangers.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
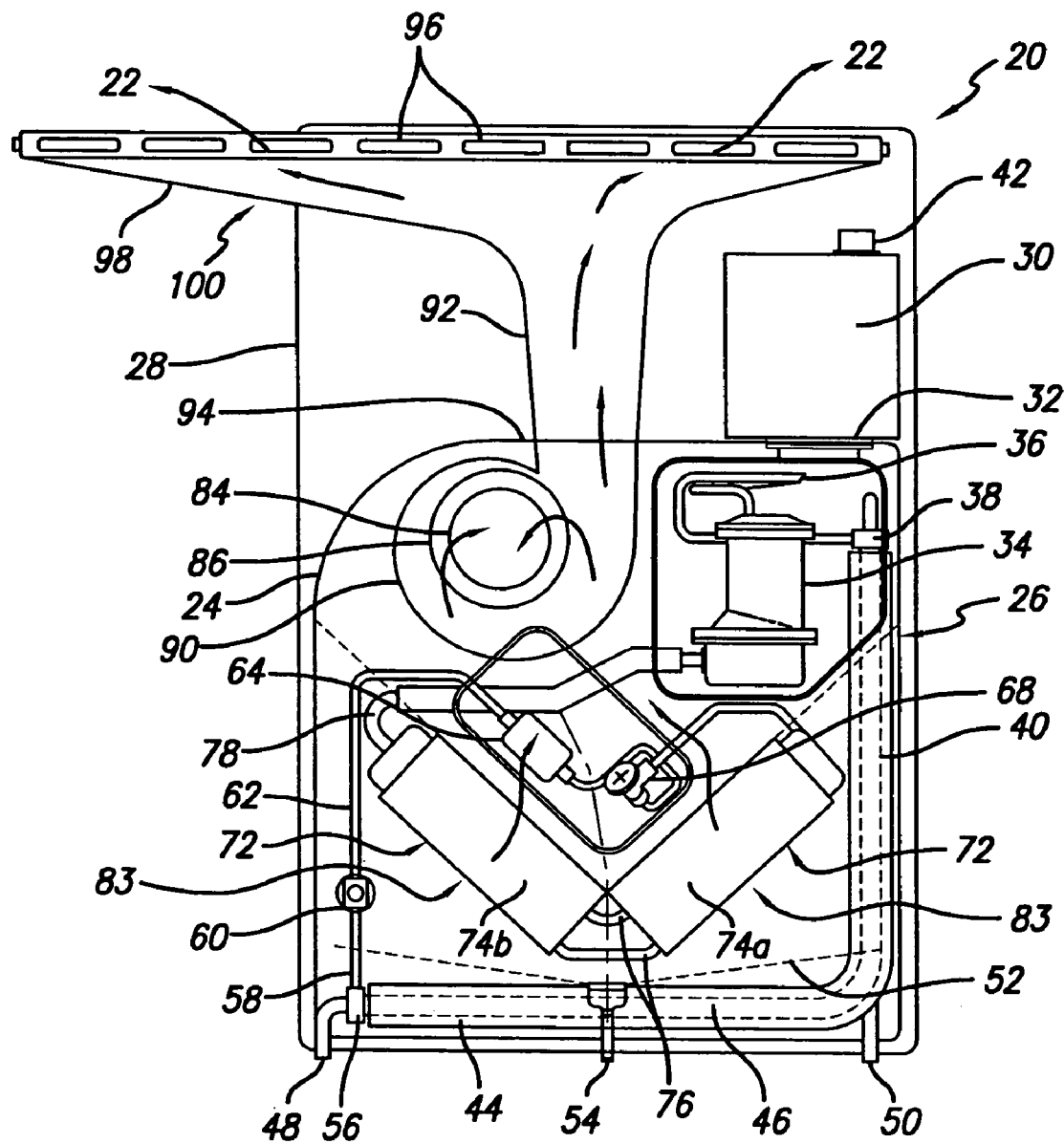
FIG. 1 is a schematic diagram of the internal arrangement of a first embodiment of the galley cooling system of the invention.

The present invention is directed to systems for refrigerating food carts within an aircraft galley system. Generally, the system uses a fluid to transfer the galley cooling heat, as well as the refrigeration system thermal losses to a remote location within the aircraft that can accommodate its weight, size and heat rejection. The present invention provides for an "air over" galley cooling system adapted to be mounted in an aircraft galley cabinet containing food carts. In an alternative embodiment, the present invention provides a system that includes a set of remote chillers which remove heat from a distributed liquid refrigerant system, which in turn removes heat from one or more food carts to refrigerate the food carts. The entire system is electronically monitored and controlled to provide a sufficiently chilled environment within a potentially large number of food carts.

As illustrated in the FIGS. 1-8, in a first embodiment, the galley cooling system 20 supplies cool air 22 for point-of-use cooling of an aircraft galley cabinet. The galley cooling system includes a housing 24 providing an enclosure portion 26 for the components of the galley cooler, and a back mounting plate 28, to which some of the components of the galley cooling system are mounted. The galley cooling system includes an electrical power supply 30, connected by electrical connector 32 to a compressor motor 34, which compresses a refrigerant coolant and delivers the compressed refrigerant coolant through tubing 36 to an inlet 38 of a condenser 40.

The electrical power supply has an input connector 42 connectable to one or more electrical cables (not shown) for supplying electrical power and electrical control signals for controlling the operation of the galley cooler, such as the speed of operation of the galley cooling system compressor motor and an air impeller motor described below, for example.

Figure 12:
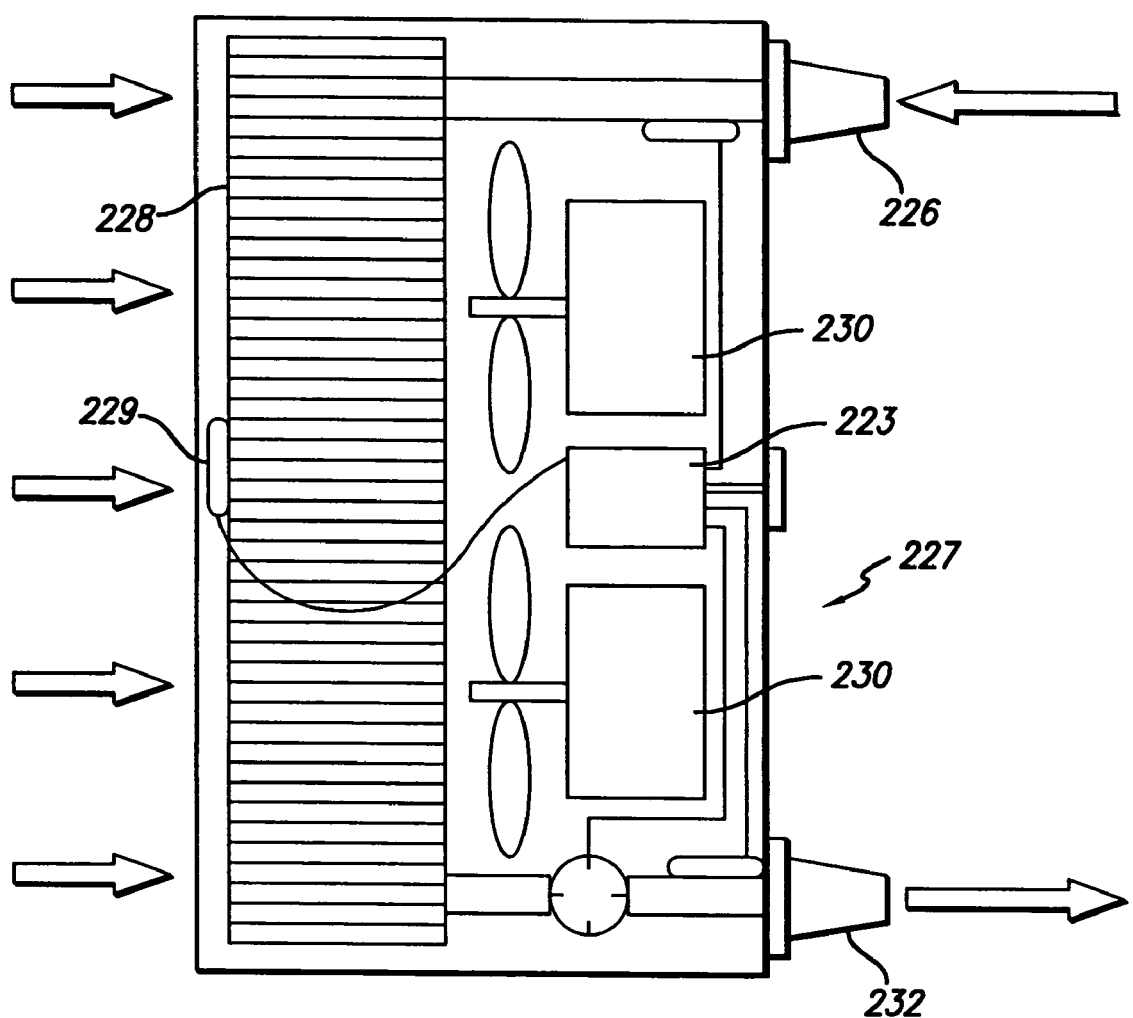
FIG. 12 is a liquid to air interface of a heat rejection unit of the liquid condensing chiller subsystem according to the second embodiment of the invention.

The condenser includes an outer cooling jacket portion 44 for cooling compressed refrigerant coolant which is conducted through a central duct 46 of the condenser. The outer cooling jacket is connected to a liquid entry duct 48, which receives a cooling flow of a cooling liquid, such as water, for example, from a cooling liquid supply (illustrated in FIG. 12) external to the aircraft galley cabinet. The cooling flow of cooling liquid flows along the length of the outer cooling jacket of the condenser to the liquid discharge outlet 50, which returns the warmed cooling liquid to the cooling liquid supply. The system cooling liquid may be water from the aircraft's potable water supply. Referring to FIG. 12, the liquid cooled condenser 204 is cooled by a heat rejection subsystem 227, by a liquid coolant 208, which may be water or a mixture of water and glycol, for example, conducted through a duct or liquid bus 209 on to the liquid pump 224, which pumps the liquid coolant to one or more heat rejection units 228, such as heat expelling heat exchangers, for example, via circulation piping 226 (FIG. 12). The system can use potable water as the liquid coolant, therein benefiting from its many advantages, such as the elimination of reservoirs and accumulators and low pump power. Additionally, the fluid piping system can be lighter and less expensive as it can operate at lower pressures, lower flow rates and does not require thermal insulation. At normal temperatures, water is one of the best heat transfer fluids available. The fluid system can be configured to fill and drain with the aircraft's potable water supply, thereby eliminating a freeze storage problem. Another advantage of the use of water as the intermediate working fluid is that potential fluid leaks are not contaminating. An optional temperature sensor 229 may be connected to a heat expelling heat exchanger to provide input to the controller 223. The heat rejection units may also include one or more fan motors and impellers 230. The liquid coolant 208 exits the heat rejection units via outlet line 232.

Condensation from the housing of the galley cooling system is collected by drain pan 52 and drains from the drain pan through a condensation drain 54 to a condensation collection tank (not shown). Cooled refrigerant coolant, which is preferably condensed to a liquid phase in the condenser, then flows from the condenser outlet 56 through ducting 58 to a sight glass 60, for viewing the condition of the refrigerant coolant exiting the condenser, through ducting 62 to a filter and dryer unit 64 that filters and removes water from the refrigerant coolant.

The filter and dryer unit is connected by ducting 66 to provide the filtered and dried refrigerant coolant to an expansion valve 68, which controls the flow of the refrigerant coolant conducted through ducting 70 to at least one evaporator unit 72.

In a presently preferred aspect of the invention, first and second evaporator units 74a and 74b are provided, connected in series by ducting 76, for receiving the cooling flow of refrigerator coolant from the condenser. Warmed refrigerant coolant exits the second evaporator unit via a suction hose 78, which is preferably provided with an outer layer of thermal insulation 80, and is returned to the inlet 82 of the compressor motor.

Air 83 from the aircraft galley cabinet is drawn into the housing of the galley cooling system by an impeller 84 driven by impeller motor 86 through at least one side vent, such as the left and right side vent portions 88a and 88b shown in FIGS. 2, 3, 4, 6 and 7. The air circulates over the evaporators, cooling the air, which is then forced by the impeller into a volute 90, through a discharge funnel 92 extending outside of the enclosure of the housing, and mounted at 94 to the housing enclosure to receive the cooled air from the volute. Cooled air exits the discharge funnel into the aircraft galley cabinet through a plurality of cooling air discharge ports 96 at the extremity of a wide discharge duct portion 98 of the discharge funnel. The air is discharged at a top side of the galley cooling system at approximately 30° F. and is returned to the left and right sides of the galley cooling system to again be cooled and discharged.

In a first embodiment illustrated in FIG. 1, the discharge funnel of the galley cooling system is greatly enlarged so as to have at least one end 100 extending beyond the width of the galley cooling system housing to provide a large distribution of cooling air over one or more galley food carts for point-of-use cooling within the aircraft galley cabinet. In a variant of the first embodiment illustrated in FIGS. 2 and 6-8, the discharge funnel of the galley cooling system does not extend beyond the width of the housing of the galley cooler.

Figure 2:
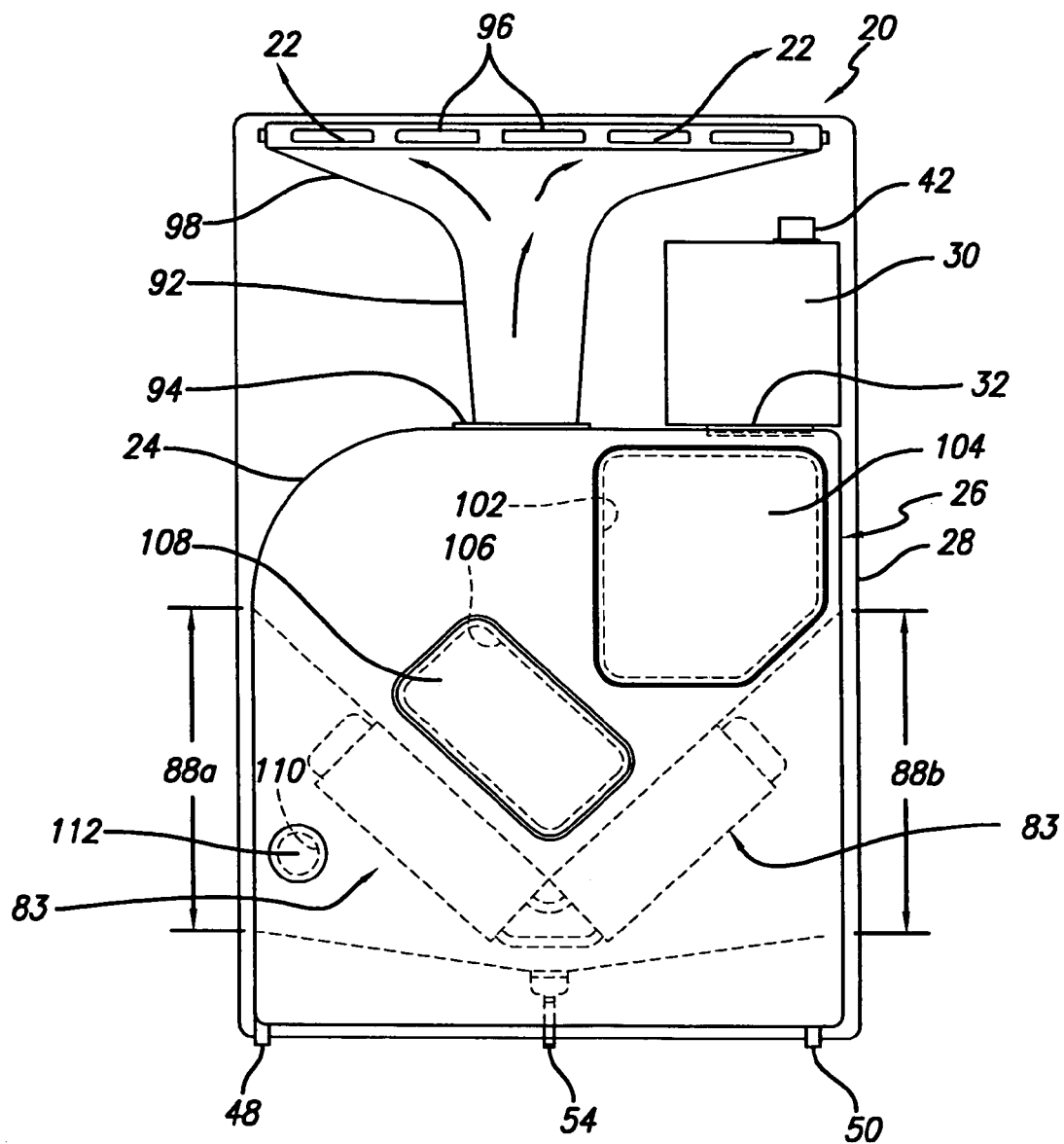
FIG. 2 is a schematic diagram of the external arrangement of a variant of the first embodiment of the galley cooling system of the invention.
Figure 3:
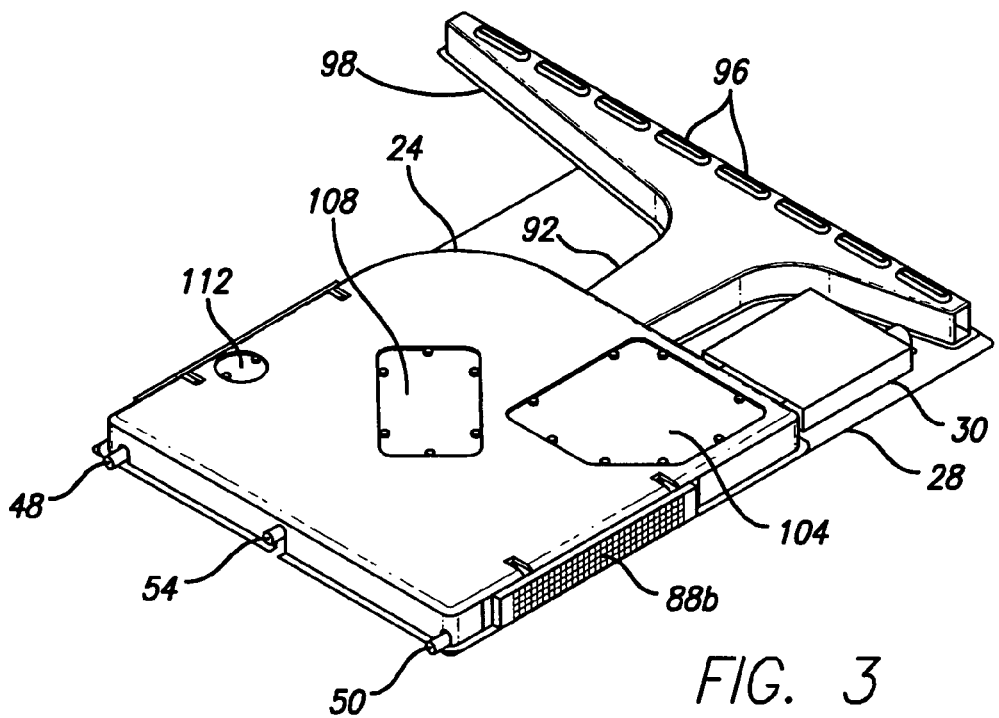
FIG. 3 is a perspective view of a first side of the galley cooling system of FIG. 1.
Figure 4:
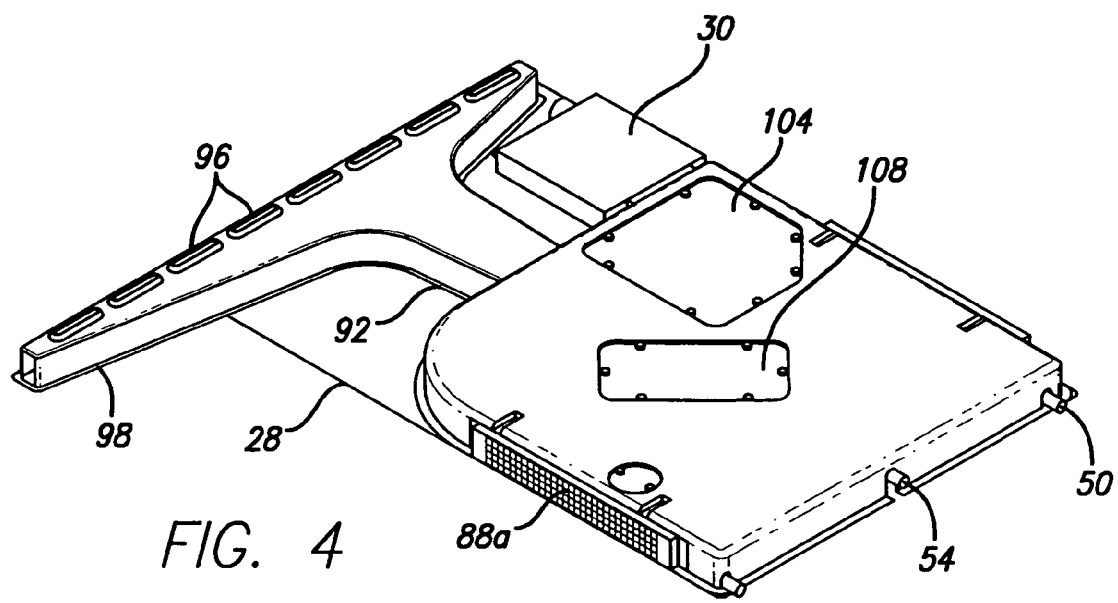
FIG. 4 is a perspective view of a second side of the galley cooling system of FIG. 1.
Figure 5:
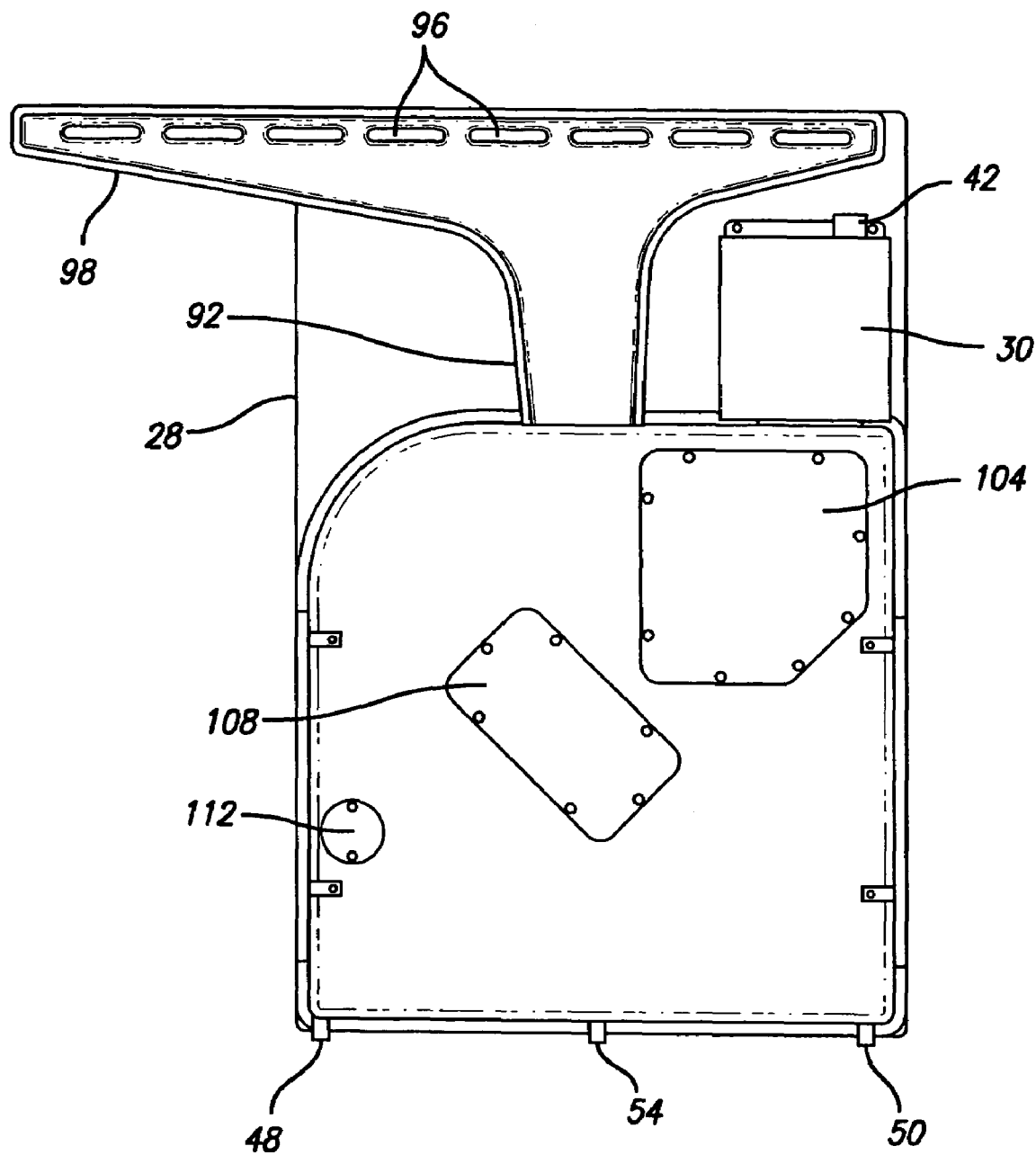
FIG. 5 is a top plan view of the galley cooling system of FIG. 1.
Figure 6:
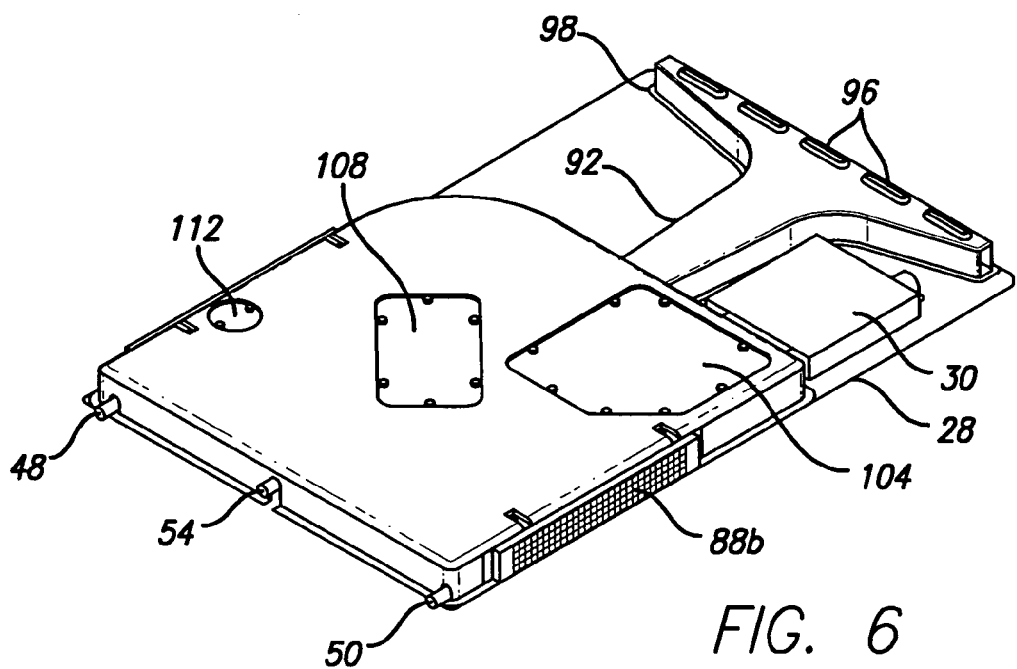
FIG. 6 is a perspective view of a first side of the galley cooling system of FIG. 2.
Figure 7:
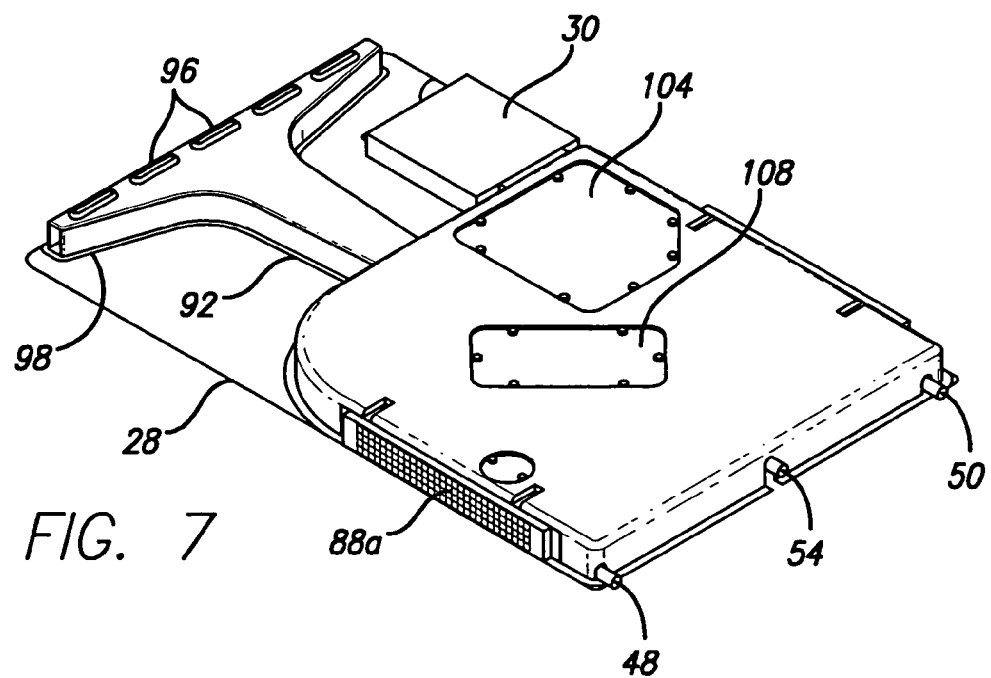
FIG. 7 is a perspective view of a second side of the galley cooling system of FIG. 2.
Figure 8:
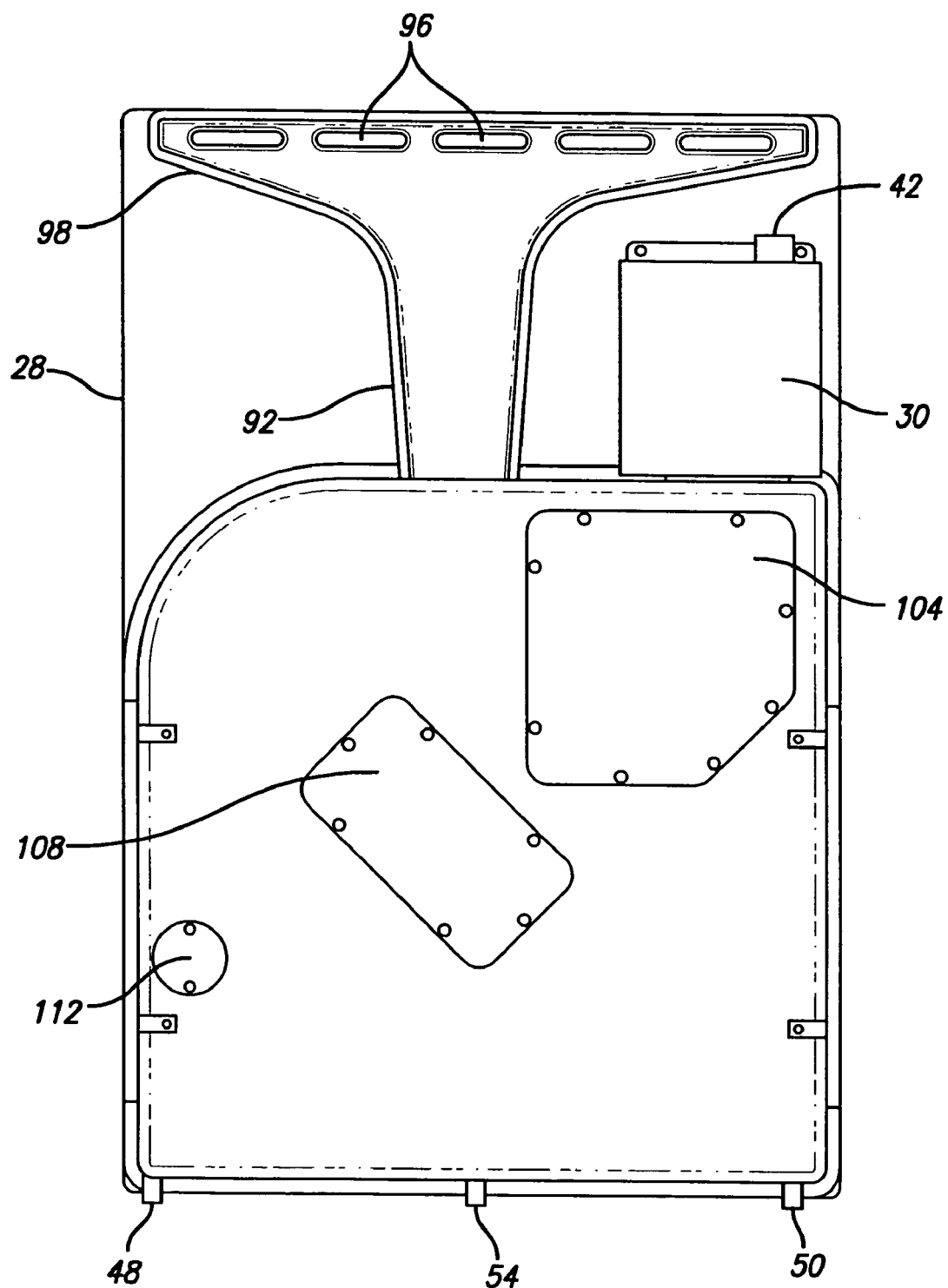
FIG. 8 is a top plan view of the galley cooling system of FIG. 2.
Figure 9:
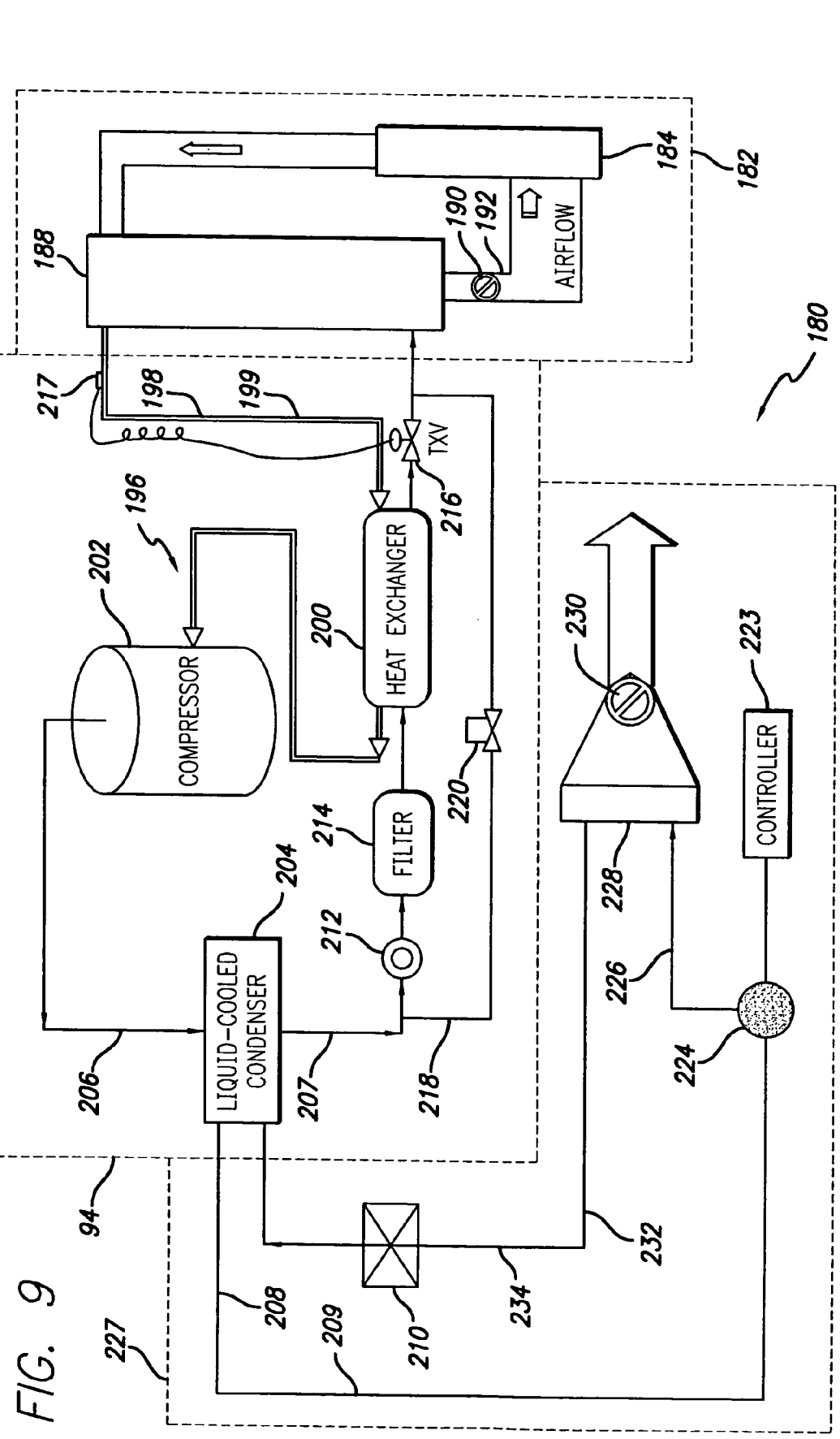
FIG. 9 is a schematic diagram illustrating a general overview of a second embodiment of the galley refrigeration system for aircraft according to the invention.

As is illustrated in FIG. 2, the enclosure portion of the housing preferably includes a compressor motor access opening 102 and a compressor motor maintenance cover 104 over the compressor motor access opening that can be moved or removed for maintenance or replacement of the compressor motor. The housing enclosure portion also preferably includes a filter/dryer access opening 106 and a filter/dryer maintenance cover 108 over the filter/dryer access opening that can be moved or removed for maintenance or replaceinent of the filter and dryer unit, as well as a sight glass access opening 110 and a sight glass cover 112 that can be moved or removed for viewing the sight glass. Access openings and maintenance covers may alternatively be provided on the mounting plate.

Figure 13:
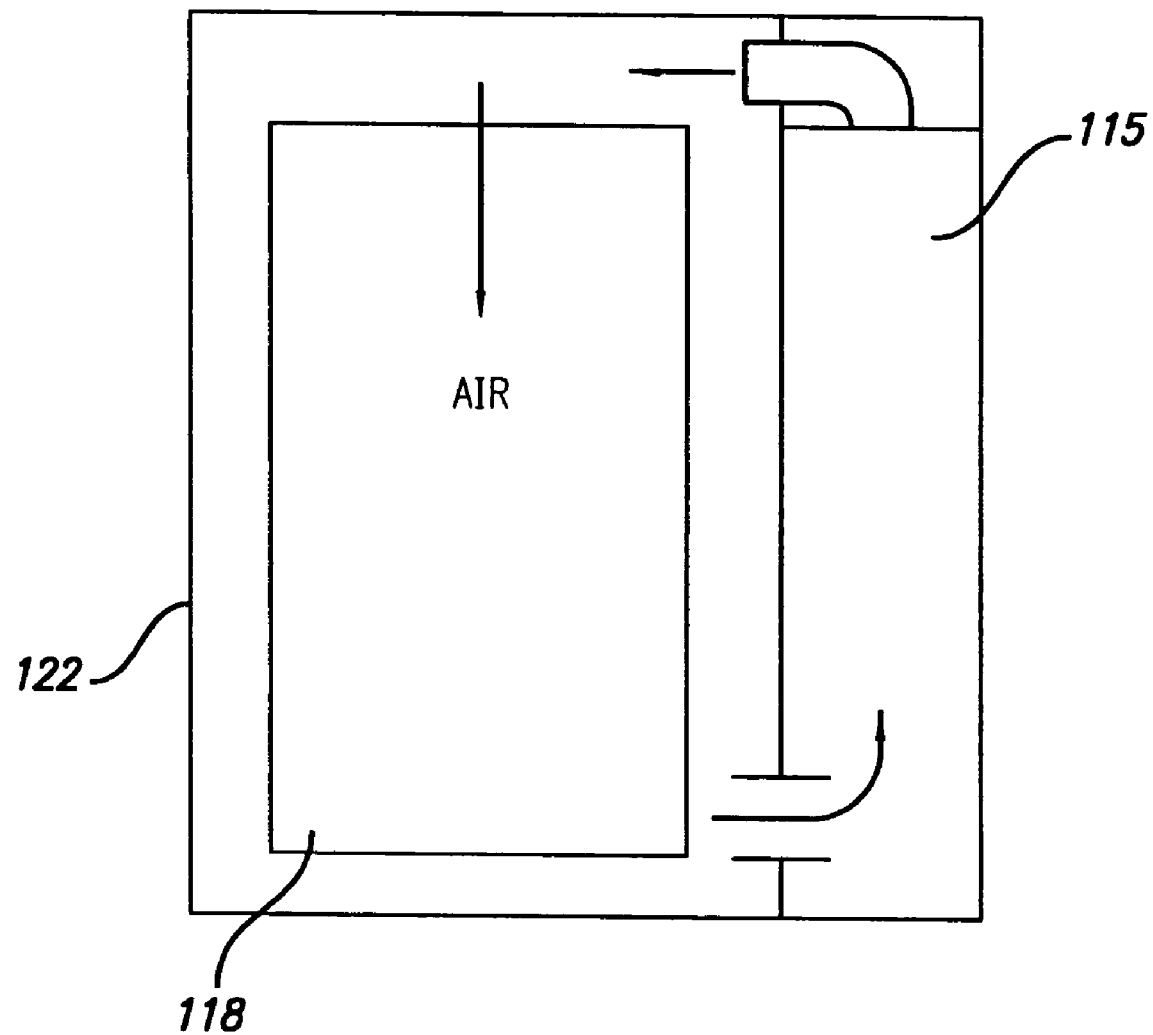
FIG. 13 is a diagram of a galley food cabinet air over point-of-use cooling system of the first embodiment.

It should be appreciated that the point-of-use portion of the galley cooling system is a complete refrigeration system, which requires only electrical power, and a liquid to cool the condenser. FIG. 13 illustrates the "air over" point-of-use cooling embodiment providing a large distribution of cooling air over the galley food cart 118 within the aircraft galley cabinet 122.

Figure 14:
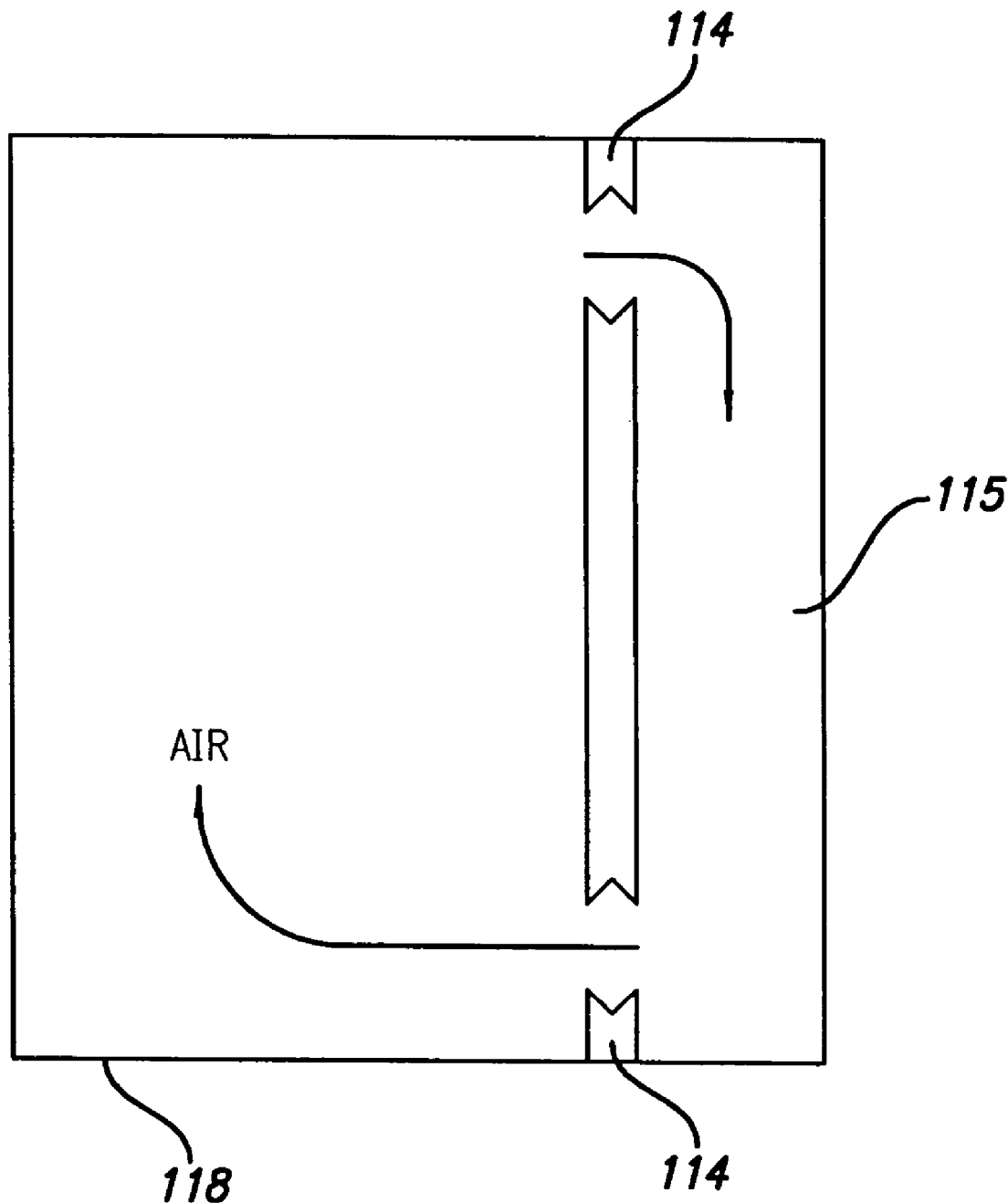
FIG. 14 is a diagram of a galley food cart air through point-of-use cooling variant of the first embodiment.
Figure 15:
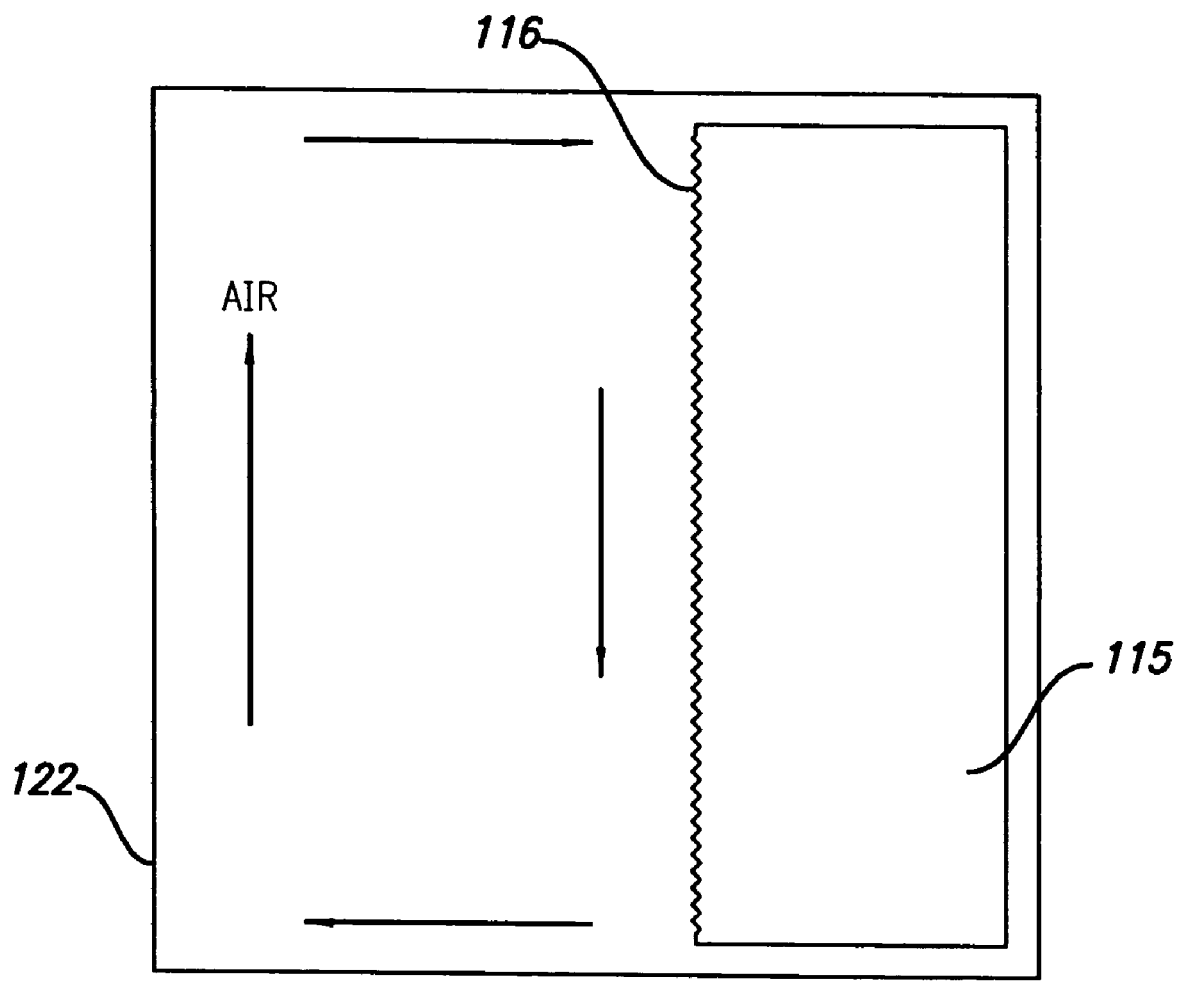
FIG. 15 is a diagram of a galley food cabinet depicting a point-of-use thermal convection surface.
Figure 16:
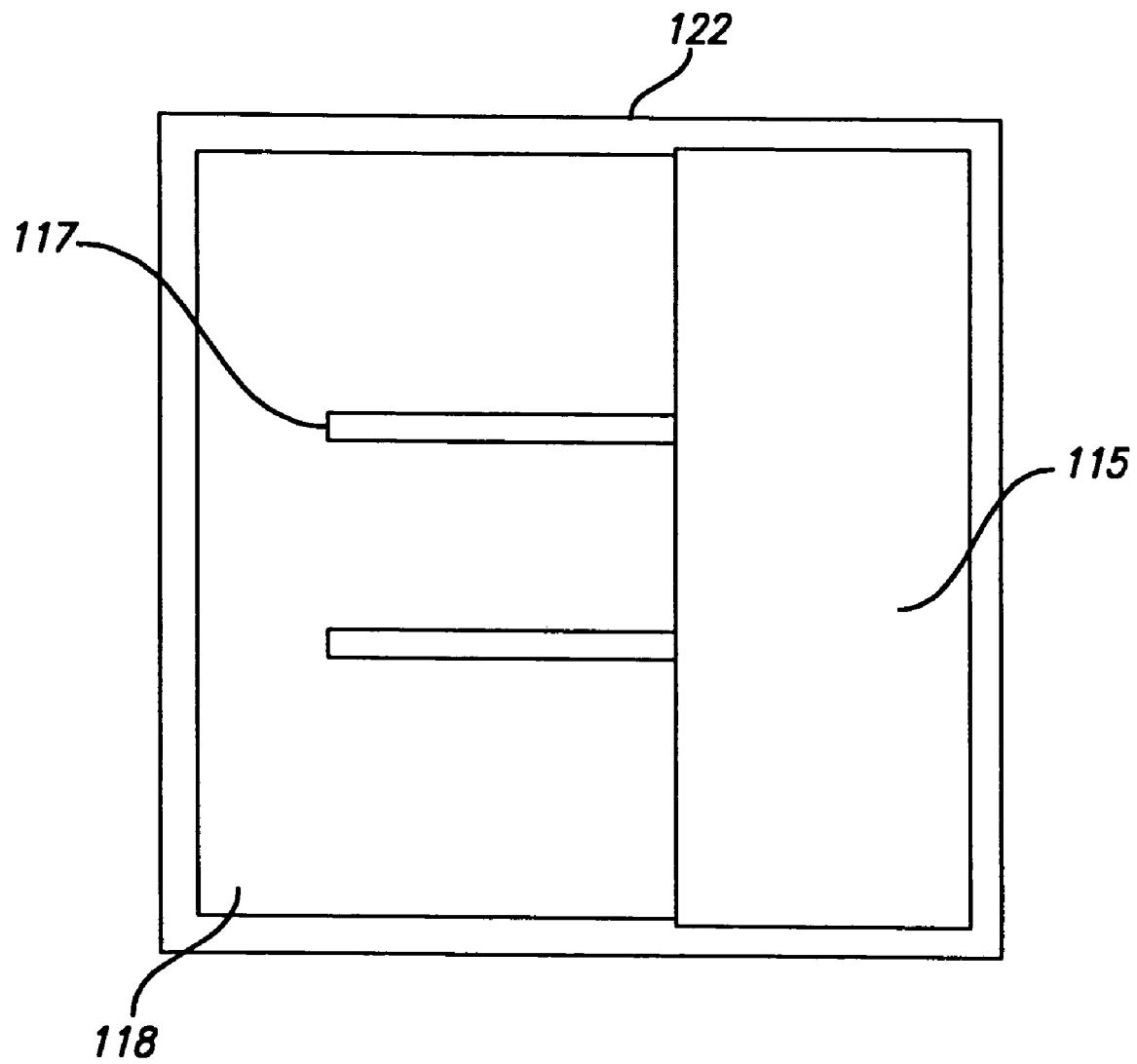
FIG. 16 is a diagram of the galley food cabinet of FIG. 15 further depicting the thermal convection shelves.

In another presently preferred aspect of the invention, illustrated in FIG. 14, an "air through" galley cooling system is configured to supply cool air directly to the galley food cart ports via flexible ducting 114, thereby cooling galley cart contents directly. The galley cooling system 115 can be mounted in a galley cabinet, so that cool air is discharged from the galley cooling system and circulates within the galley cabinet to return to the galley cooling system to again be cooled and discharged. FIGS. 15 and 16 illustrate another presently preferred aspect of the invention, in which the galley cooling system 115 can be configured to provide "thermal convection" cooling directly to the convection surfaces 116 and the galley food cart shelves 117, thereby providing direct cooling to the food. The galley food cart shelves 117 receive direct cooling from the convection surface 116 and the cooling air flowing through the galley food cabinet 122 to remove heat. Alternatively, other direct cooling methods can be used to provide convection cooling to the galley food cart 118, such as cooling coils or thermoelectric Peltier cooling devices.

Referring to FIGS. 9, 10, 11 and 12, in a second embodiment according to the invention, a liquid condensing air chilling system (LCACS) 180 according to the invention includes at least one point-of-use galley cooling unit 182 having at least one galley plenum 184 for receiving at least one galley cart (not shown), and at least one heat exchanger 188 which is typically an evaporator within the galley plenum 184. A galley blower 190 or fan is typically provided in ducting 192 between the heat exchanger 188 and the galley plenum 184 to direct a flow of cooling air from the heat exchanger 188 through the one or more galley carts. The one or more heat exchangers 188 receive an intermediate working fluid 198 such as a refrigerant or other heat transfer fluid from at least one remote liquid condensing chiller subsystem 194. The refrigerant is typically a hydrofluorocarbon refrigerant such as that sold under the name HFC-134a available from DuPont, or sold under the name MEFOREX 134a, or HT 134a, available from Ausimont, although other similar refrigerants may also be suitable.

The remote liquid condensing chiller subsystem 194 includes at least one recirculation unit 196 to cool, and redistribute the intermediate working fluid 198 from the heat exchanger 188 throughout a remote chiller subsystem and to return the intermediate working fluid 198 to the heat exchanger 188 of the galley cooling unit. The intermediate working fluid 198 carries heat from the one or more galley cooling units via line 199 through an optional heat exchanger or intercooler 200, which will be explained further below, to at least one compressor 202, which compresses the intermediate working fluid 198. The intermediate working fluid 198 flows to at least one liquid cooled condenser heat exchanger 204 via line 206.

The condenser heat exchanger 200 is liquid cooled instead of air cooled, advantageously eliminating a conventional condenser airflow fan, since heat rejection is accomplished by circulation of a liquid coolant, as will be further discussed below. Elimination of the condenser airflow fan considerably reduces noise which is otherwise typically transmitted to the galley in conventional galley cooling systems. Elimination of such a condenser airflow fan also reduces the size of the liquid condensing air chiller.

Figure 11:
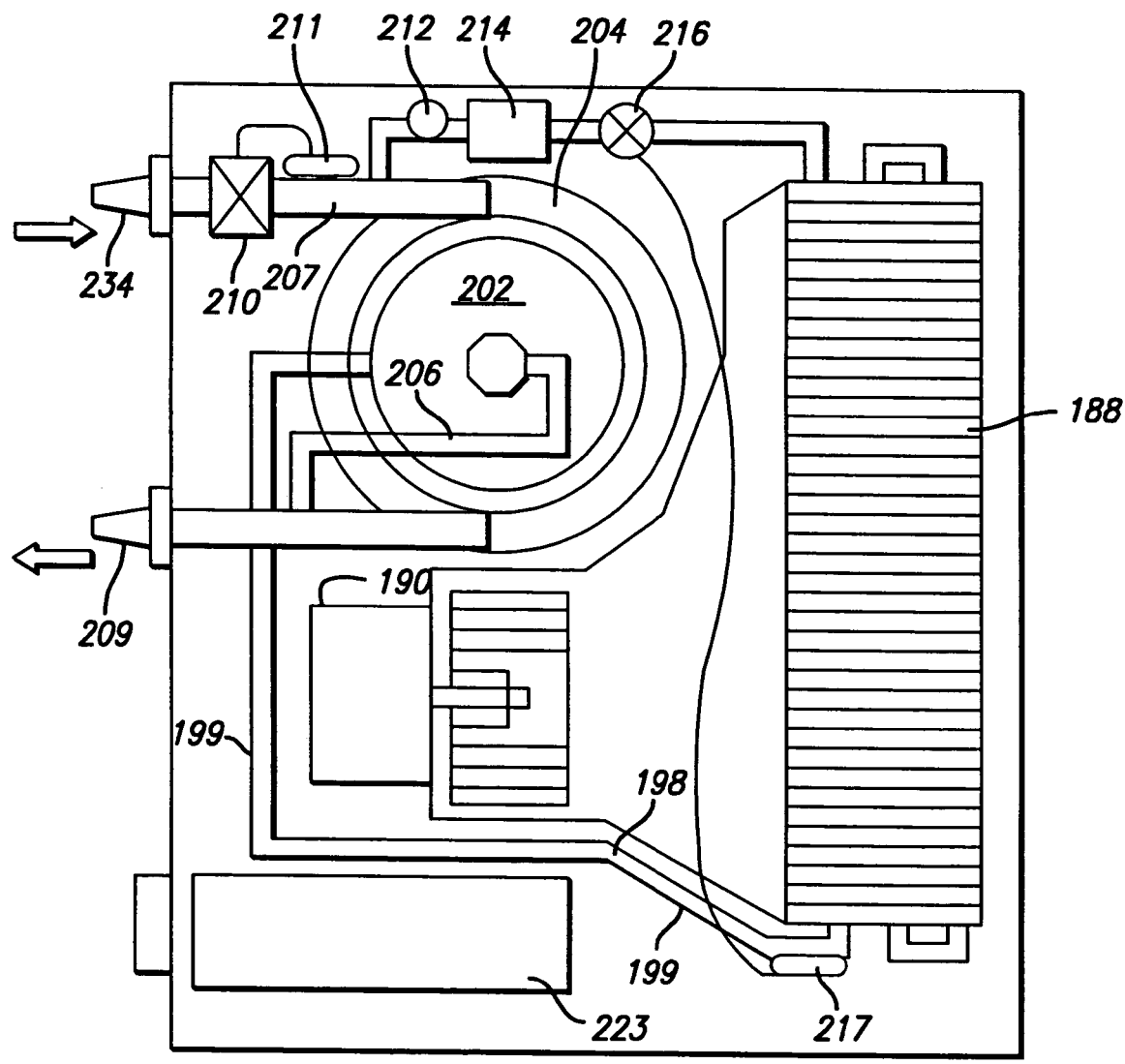
FIG. 11 is a schematic diagram of a liquid condensing chiller of the liquid condensing chiller subsystem according to the second embodiment of the invention.

From the liquid cooled condenser 204, the chilled intermediate working fluid 198 circulates by line 207 to a sight glass 212, to a filter 214, to the optional heat exchanger 200, and to an expansion valve 216, receiving input from temperature and/or pressure sensor 217 connected to the intermediate working fluid line 199, to control the flow of the intermediate working fluid 198 to the evaporator 188 (FIG. 11). A bypass line 218 may also be provided, connected between the line 207 and the evaporator 188, and having a solenoid valve 220 for controlling flow of the intermediate working fluid through the bypass line 218 directly to evaporator 188, so as to bypass the sight glass 212, filter 214, heat exchanger 200, and expansion valve 216 when desired.

As outlined above and depicted in FIGS. 9, 10, 11 and 12, the remote liquid condensing chiller subsystem 194 may also include a comprehensive electronic subsystem to monitor and control the operation of the system, such as a controller 223 and associated temperature sensors, pressure sensors, and liquid level sensors can be strategically located for system performance and protection optimization. The system monitoring and control device 223 may also receive input from the remote liquid condensing chiller subsystem 194 and the galley cooling unit 182. With this information, the system monitoring and control device 223 may control the functioning of each and every electronic and refrigeration component of the entire system. A galley control device 223 may also be associated with each galley cooling unit 182, and an air outlet temperature sensor and an air supply temperature sensor may provide input to the galley control device. The galley control device 223 may then turn on or off the blower 190 of the galley cooling unit 182.

Referring to FIG. 12, the liquid cooled condenser 204 is cooled by a heat rejection subsystem 227, by a liquid coolant 208, which may be water or a mixture of water and glycol, for example, conducted through a duct or liquid bus 209 on to the liquid pump 224, which pumps the liquid coolant to one or more heat rejection units 228, such as heat expelling heat exchangers, for example, via circulation piping 226 (FIG. 12). The system can use potable water as the liquid coolant, therein benefiting from its many advantages, such as the elimination of reservoirs and accumulators and low pump power. Additionally, the fluid piping system can be lighter and less expensive as it can operate at lower pressures, lower flow rates and does not require thermal insulation. At normal temperatures, water is one of the best heat transfer fluids available. The fluid system can be configured to fill and drain with the aircraft's potable water supply, thereby eliminating a freeze storage problem. Another advantage of the use of water as the intermediate working fluid is that potential fluid leaks are not contaminating. An optional temperature sensor 229 may be connected to a heat expelling heat exchanger to provide input to the controller 223. The heat rejection units may also include one or more fan motors and impellers 230. The liquid coolant 208 exits the heat rejection units via outlet line 232, and is conducted via liquid bus or duct 234 and optionally through a liquid control valve 220, optionally receiving control input from a temperature sensor 211 (FIG. 11), to return to the liquid cooled condenser 204.

The heat rejection units 228 are also typically connected to the controller 223, and may include temperature sensors 229 mounted at suitable locations in the heat rejection units for controlling the operation of the liquid pump and fan motor and impeller of the heat rejection units. Additional data acquisition devices may also be provided for monitoring and controlling the operation of the heat rejection units, such as heat transfer liquid in and out temperature sensors and pressure sensors, for optimization of system operation. The fan motor may also be provided with variable speed control. The heat rejection units 228 may also be provided with liquid flow metering sensors and ambient sensors to monitor and record heat rejection rates. The heat rejection units typically would be located in an area where the heat can be adequately exhausted.

The intermediate working fluid 198 is preferably routed via non-insulated pipes, and the liquid coolant 208 is routed through liquid bus 209 via non-insulated pipes, because heat rejection via these liquid buses is desirable, unless heat reclamation is to be associated with the system. The liquid coolant pump 224 circulates the liquid coolant 208, and typically is associated with the electronic controller 223 for the system's operation. A liquid to gas separator may also be included in the pumping unit 224, or may be remotely located, to remove any air that is entrapped in the liquid loop, in order to enhance the system's performance. A charge port may also be provided in the pumping unit for introducing the liquid coolant into the line 209, such as from the aircraft potable water supply, or such a charge port can be remotely located. The liquid coolant pump, and the associated expansion tank and liquid to gas-separator can be incorporated in a heat rejection unit if space is available.

Figure 10:
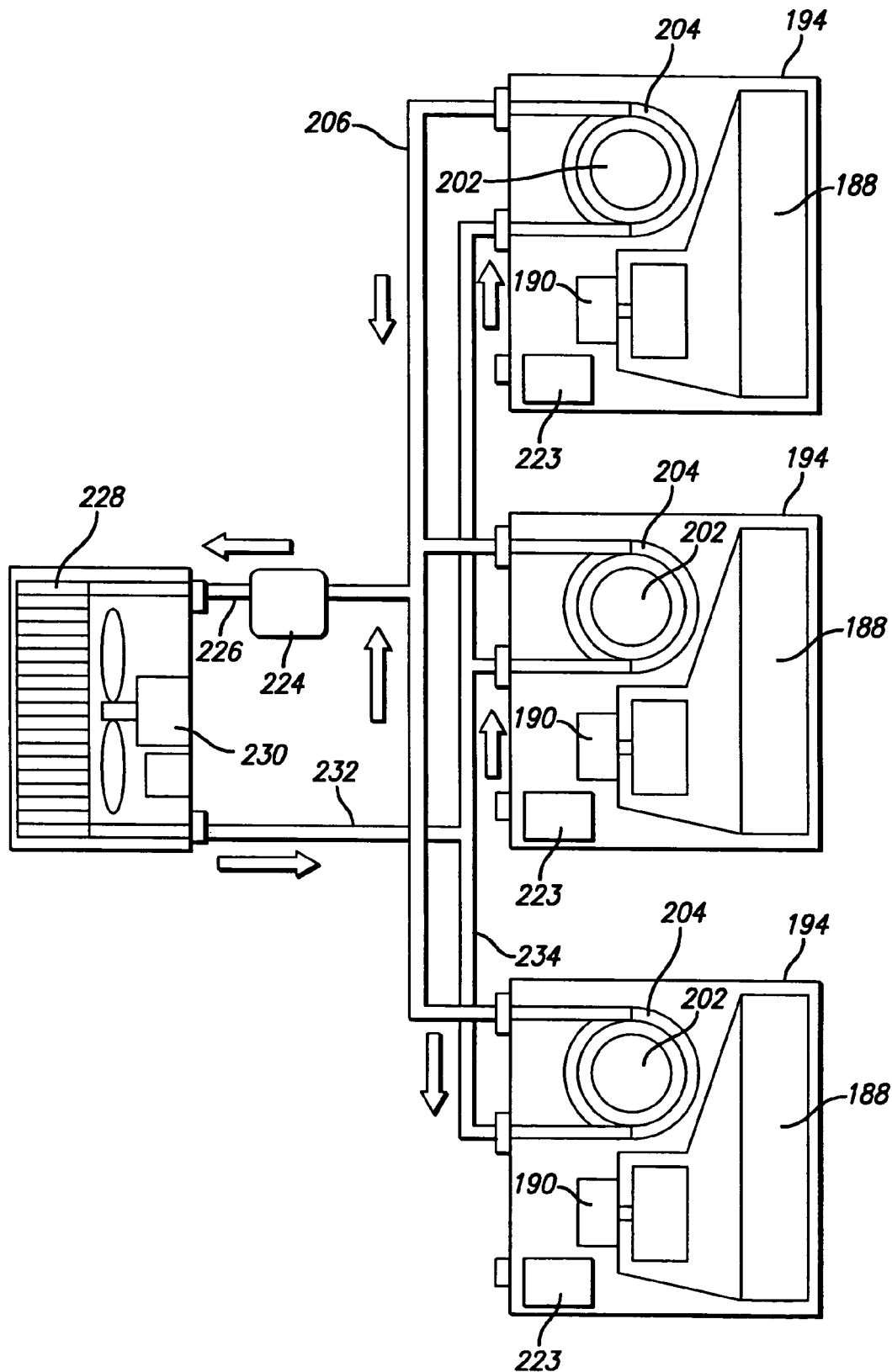
FIG. 10. is a schematic diagram of a liquid condensing chiller subsystem according to the second embodiment of the invention.

FIG. 10 illustrates an alternative embodiment of liquid condensing air chilling system including a single heat rejection unit 228 removing heat from three remote liquid condensing chiller subsystems 194. The liquid condensing chiller subsystems 194 share common liquid coolant lines and ducts. The heat rejection unit 228 further include one fan motor and impellor unit 230. In an alternative aspect of the of the heat rejection unit, two fan motor and impellor units 230 can be included to expel heat in high temperature environments.

From the foregoing, it can be seen that the operation of the aircraft liquid condenser air chiller system 180 of the invention utilizes two distinct heat transfer loops. In the first loop, heat is transferred from the air in the galley cooling unit 182 where refrigeration is desired via the evaporator to the refrigerant, which is then pumped via the compressor 202, as a high pressure and temperature superheated gas, to the liquid cooled condenser 204. In the liquid cooled condenser 204 the superheated gas transfers heat to the liquid coolant which is circulated via the liquid bus 209 to the heat rejection unit 228. The refrigerant in the first loop condenses as a result of the heat rejection, later undergoes a throttling process via the expansion valve 216, and enters the evaporator 188, typically as a two phase, liquid-gas fluid, to complete the refrigeration vapor cycle.

In the second heat transfer loop, heat is transferred from the liquid cooled condenser 204 via the liquid coolant to the heat rejection unit 228. Heat is rejected at that location to the local ambient air via a fan motor and impeller 230, although the heat may alternatively be reclaimed for other purposes. The cooled heat transfer liquid flows back via the liquid bus 234 to the air chillers, and the cycle of heat absorption and rejection is completed.

The operating temperature range for the condenser liquid coolant is based on the heat sink temperature, e.g., typically 15° F. to 30° F. hotter than the heat sink temperature. The heat sink is normally ambient air, typically in the range of 85° F. to 130° F. In flight, when the outside air can be as low as −65° F., i.e., the skin temperature of the aircraft, the heat sink air that is used can be the ambient cabin air which is commonly about 70° F. Refrigeration units may tolerate up to 130° ambient temperature. Typically, the operating temperature range of the condenser liquid coolant will be about 40° F. to 160° F. If the aircraft is in a freezing zone the liquid coolant fluid flow needs to be controlled, or if the aircraft is to be stored in a freezing zone the liquid coolant can be drained, so that the liquid coolant will not freeze.

In applications where the heat sink temperature is relatively high, the heat rejection device may be another refrigeration unit that, operating together with the primary galley refrigeration unit, will form a two-stage cooling system. The two-stage cooling system may be may be utilized when the second stage refrigeration unit is available on the aircraft for other cooling purposes. For example, for cooling air at 130° F., a second stage refrigeration unit could be used for the greater temperature range, i.e., for a food cooling requirement of 0° F. the first stage cooling range may be −20° F. to 65° F. and the second stage cooling range may be 65° F. to 150° F. The second stage refrigeration unit can be a ground based unit that is only needed in high ambient conditions. The second stage refrigeration system can include any conventional refrigeration system.

The galley cooling system of the present invention can include one or more typically pressure sensors for controlling the flow of the fluid within the system. The cooling system is typically vented to ambient aircraft cabin pressure, which typically ranges from 14.7 psi standard atmospheric pressure to the aircraft cabin pressure at about 8,000 feet, i.e., greater than 7 psi or −7 psi gauge pressure. Under 7 psi, the liquid coolant can form bubbles and interfere with pumping and fluid flow.

It should be appreciated that the liquid cooled condenser could be replaced with a refrigerant-to-liquid heat exchanger, in which heat would be removed by a liquid coolant, such as water or a water-glycol mixture if protection from freezing is desired, for example, which could be pumped to a condensing unit. The heated liquid coolant could be connected to a fluid bus and routed via non-insulated pipes to one or more centralized or semi-centralized condensing units which could consist of a liquid-to-air heat exchanger, an electric fan, and optionally a fluid pump. The location of the one or more condenser units would need to be in an area where the heat would be adequately exhausted. In addition, this heat could be reclaimed for use in other areas to replace or supplement electrical heaters. It should also be readily appreciated that a further advantage of the present invention is that the design of the heat exchanger is such that an air filter would not be required, thereby eliminating routine air filter cleaning that is commonly required with current air chiller designs. Supplemental cooling of the heat rejection units while an aircraft is grounded, such as by circulating chilled water, for example, is also a further option in high ambient temperature areas.

While the specification describes particular embodiments of the present invention, those of ordinary skill can devise variations of the present invention without departing from the inventive concept.

We claim:

1. A method for cooling a galley food cart on an aircraft comprising:
    transferring heat from a galley food cart by a point-of-use heat exchange system to a liquid cooled condenser, wherein said step of transferring heat from said galley food cart comprises cycling a flow of cooling air from a heat exchanger cooled by said liquid cooled condenser through an air over system to provide cooling air over at least one food cart in a galley cabinet;
    circulating liquid coolant through said liquid cooled condenser to remove heat from said liquid cooled condenser;
    circulating said liquid coolant from said liquid cooled condenser in a liquid coolant loop to a heat expelling heat exchanger expelling heat to a heat sink for cooling said liquid coolant; and
    circulating cooled liquid coolant in said liquid coolant loop to said liquid cooled condenser, and wherein said liquid coolant is maintained at a temperature from about 15° F. to about 30° F. above a temperature of said heat sink.

2. The method of claim 1, further comprising expelling said heat from said heat expelling heat exchanger to a location remote from said galley food cart.

3. The method of claim 1, wherein said step of transferring heat from said galley food cart comprises cycling a flow of cooling air from a thermal convection air cooling system providing at least one cooled galley food cart surface to remove heat therein.

4. The method of claim 1, wherein said circulating liquid coolant is maintained in a temperature range from about 40° F. to about 160° F.

5. The method of claim 1, wherein said circulating coolant liquid is water.

6. The method of claim 1, wherein said circulating liquid coolant is a mixture of water and glycol.

7. The method of claim 1, wherein said heat expelling heat exchanger comprises a second stage refrigerant cooling system.

8. The method of claim 1, wherein heat from a plurality of galley food carts is transferred to said circulating liquid coolant.

9. A method for cooling a galley food cart on an aircraft comprising:
    transferring heat from a galley food cart by a point-of-use heat exchange system to a liquid cooled condenser, wherein said step of transferring heat from said galley food cart comprises cycling a flow of cooling air from a heat exchanger cooled by said liquid cooled condenser through an air through system to provide cooling air directly through ports in at least one said galley food cart;
    circulating liquid coolant through said liquid cooled condenser to remove heat from said liquid cooled condenser;
    circulating said liquid coolant from said liquid cooled condenser in a liquid coolant loop to a heat expelling heat exchanger expelling heat to a heat sink for cooling said liquid coolant; and
    circulating cooled liquid coolant in said liquid coolant loop to said liquid cooled condenser, and wherein said liquid coolant is maintained at a temperature from about 15° F. to about 30° F. above a temperature of said heat sink.

10. The method of claim 9, further comprising expelling said heat from said heat expelling heat exchanger to a location remote from said galley food cart.

11. The method of claim 9, wherein said step of transferring heat from said galley food cart comprises cycling a flow of cooling air from a thermal convection air cooling system providing at least one cooled galley food cart surface to remove heat therein.

12. The method of claim 9, wherein said circulating liquid coolant is maintained in a temperature range from about 40° F. to about 160° F.

13. The method of claim 9, wherein said circulating coolant liquid is water.

14. The method of claim 9, wherein said circulating liquid coolant is a mixture of water and glycol.

15. The method of claim 9, wherein said heat expelling heat exchanger comprises a second stage refrigerant cooling system.

16. The method of claim 9, wherein heat from a plurality of galley food carts is transferred to said circulating liquid coolant.

17. A cooling system for providing cooling air to cool at least one food cart in an aircraft galley, comprising:
    a point of use food cooling heat exchange system for transferring heat from a galley food cart, said food cooling heat exchange system including a liquid cooled condenser for receiving said heat, wherein said point of use food cooling heat exchange system comprises means for cycling a flow of cooling air from a heat exchanger cooled by said liquid cooled condenser through an air over system to provide cooling air over at least one food cart in a galley cabinet;
    means for circulating liquid coolant through said liquid cooled condenser to remove heat from said liquid cooled condenser;
    a heat expelling heat exchanger expelling heat to a heat sink; and means for circulating said liquid coolant from said liquid cooled condenser in a liquid coolant loop through said heat expelling heat exchanger, and wherein said liquid coolant is maintained at a temperature from about 15° F. to about 30° F. above a temperature of said heat sink.

18. The cooling system of claim 17, further comprising means for expelling said heat from said heat expelling heat exchanger to a location remote from said galley food cart.

19. The cooling system of claim 17, wherein point of use food cooling heat exchange system comprises means for cycling a flow of cooling air from a thermal convection air cooling system providing at least one cooled galley food cart surface to remove heat therein.

20. The cooling system of claim 17, wherein said circulating liquid coolant is maintained in a temperature range from about 40° F. to about 160° F.

21. The cooling system of claim 17, wherein said circulating coolant liquid is water.

22. The cooling system of claim 17, wherein said circulating liquid coolant is a mixture of water and glycol.

23. The cooling system of claim 17, wherein said heat expelling heat exchanger comprises a second stage refrigerant cooling system.

24. The cooling system of claim 17, wherein heat from a plurality of galley food carts is transferred to said circulating liquid coolant.

25. A cooling system for providing cooling air to cool at least one food cart in an aircraft galley, comprising:
a point of use food cooling heat exchange system for transferring heat from a galley food cart, said food cooling heat exchange system including a liquid cooled condenser for receiving said heat, wherein said point of use food cooling heat exchange system comprises means for cycling a flow of cooling air from a heat exchanger cooled by said liquid cooled condenser through an air through system to provide cooling air directly through ports in at least one said galley food cart;
means for circulating liquid coolant through said liquid cooled condenser to remove heat from said liquid cooled condenser;
a heat expelling heat exchanger expelling heat to a heat sink; and
means for circulating said liquid coolant from said liquid cooled condenser in a liquid coolant loop through said heat expelling heat exchanger, and wherein said liquid coolant is maintained at a temperature from about 15° F. to about 30° F. above a temperature of said heat sink.

26. The cooling system of claim 25, further comprising means for expelling said heat from said heat expelling heat exchanger to a location remote from said galley food cart.

27. The cooling system of claim 25, wherein point of use food cooling heat exchange system comprises means for cycling a flow of cooling air from a thermal convection air cooling system providing at least one cooled galley food cart surface to remove heat therein.

28. The cooling system of claim 25, wherein said circulating liquid coolant is maintained in a temperature range from about 40° F. to about 160° F.

29. The cooling system of claim 25, wherein said circulating coolant liquid is water.

30. The cooling system of claim 25, wherein said circulating liquid coolant is a mixture of water and glycol.

31. The cooling system of claim 25, wherein said heat expelling heat exchanger comprises a second stage refrigerant cooling system.

32. The cooling system of claim 25, wherein heat from a plurality of galley food carts is transferred to said circulating liquid coolant.

33. A cooling system for providing cooling air to cool an aircraft galley, comprising:
a housing including an enclosure with at least one vent for receiving air from the aircraft galley;
a compressor motor mounted to the housing for compressing a refrigerant coolant;
a condenser mounted to the housing for receiving and cooling the refrigerant coolant from the compressor motor;
an expansion valve mounted to the housing receiving cooled refrigerant coolant from the condenser;
at least one evaporator unit disposed within the housing receiving refrigerant coolant from the expansion valve;
means for returning warmed refrigerant coolant from the at least one evaporator unit to the compressor motor;
impeller means connected to the housing for drawing air from the aircraft galley into the housing of the cooling system through said at least one vent to circulate the air from the aircraft galley over the at least one evaporator to cool the air; and
discharge means for receiving cooled air from the impeller means and discharging the cooled air into the aircraft galley.

34. The cooling system of claim 33, wherein the discharge means comprises a volute for receiving air from the impeller.

35. The cooling system of claim 34, further comprising a discharge funnel connected to the volute for discharging cold air from the volute, the discharge funnel extending outside of the enclosure of the housing.

36. The cooling system of claim 35, wherein the discharge funnel comprises a plurality of cooling air discharge ports.

37. The cooling system of claim 33, further comprising a sight glass connected to a refrigerant coolant duct connected to the condenser for viewing the condition of the refrigerant coolant exiting the condenser.

38. The cooling system of claim 37, wherein the housing comprises a sight glass access opening, and a sight glass cover mounted to the housing over the sight glass access opening to provide access for viewing the sight glass.

39. The cooling system of claim 33, further comprising a filter and dryer unit connected to receive refrigerant coolant for filtering and removing water from the refrigerant coolant.

40. The cooling system of claim 39, wherein the housing comprises a filter/dryer access opening, and a filter/dryer maintenance cover mounted to the housing over the filter/dryer access opening to provide access to the filter and dryer unit.

41. The cooling system of claim 33, wherein the expansion valve receives refrigerant coolant from the filter and dryer unit.

42. The cooling system of claim 33, wherein the housing comprises a compressor motor access opening, and a compressor motor maintenance cover mounted to the housing over the compressor motor access opening to provide access to the compressor motor.

43. The cooling system of claim 33, wherein the at least one vent comprises left and right side vents.

44. The cooling system of claim 33, wherein the condenser comprises an inlet and an outlet for the refrigerant coolant, a central duct connected between the inlet and the outlet, an outer cooling jacket portion disposed over at least a portion of said central duct for cooling compressed refrigerant coolant which is conducted through the central duct of the condenser.

45. The cooling system of claim 44, wherein the outer cooling jacket is connected to a liquid entry duct which receives a flow of a cooling liquid.

46. The cooling system of claim 33, wherein the cooled refrigerant coolant is condensed to a liquid phase in the condenser.

47. The cooling system of claim 33, wherein the at least one evaporator unit comprises first and second evaporator units.

48. The cooling system of claim 47, wherein the first and second evaporator units are connected in series.

49. The cooling system of claim 33, wherein the impeller means comprises an impeller and an impeller motor to drive the impeller.

50. The cooling system of claim 33, further comprising an electrical power supply connected to supply electrical power to the compressor motor and to the impeller means.

51. The cooling system of claim 50, wherein the electrical power supply has an input connector for receiving electrical power and electrical control signals for controlling the operation of the cooling system.

52. The cooling system of claim 33, further comprising a drain pan disposed within the housing for collection of condensation from the housing of the cooling system.

53. The cooling system of claim 52, wherein the drain pan further comprises a condensation drain for drainage from the drain pan.

54. A cooling system for use on aircraft, comprising:
at least one galley cooling unit having a galley plenum and an evaporator within the galley plenum for conveying heat from the galley plenum to an intermediate working fluid;
at least one liquid condensing chiller subsystem remotely located with respect to said at least one galley cooling unit;
said at least one liquid condensing chiller subsystem including at least one recirculation unit receiving the intermediate working fluid from said evaporator to cool the intermediate working fluid;
said at least one recirculation unit including a compressor connected in fluid communication with said evaporator for receiving the intermediate working fluid from said evaporator for compressing the intermediate working fluid;
said at least one recirculation unit including a liquid cooled condenser connected in fluid communication with said compressor for receiving compressed intermediate working fluid from said compressor for cooling said intermediate working fluid, said liquid cooled condenser connected in fluid communication with said evaporator for returning said intermediate working fluid to said evaporator; and
said at least one liquid condensing chiller subsystem including at least one heat expelling heat exchanger connected in fluid communication with said liquid cooled condenser for receiving a chiller liquid from said liquid cooled condenser for cooling said chiller liquid and recirculating said chiller liquid to said liquid cooled condenser.

55. The cooling system of claim 54, wherein said intermediate working fluid is water.

56. The cooling system of claim 54, wherein said galley plenum includes ducts in communication with said evaporator to direct a flow of air in thermal communication with said evaporator through the galley plenum for cooling said galley plenum.

57. The cooling system of claim 56, wherein said galley plenum further comprises a galley blower for directing the flow of air through the galley plenum for cooling said galley plenum.

58. The cooling system of claim 57, wherein said galley plenum further comprises at least one galley food cart.

59. The cooling system of claim 54, wherein said liquid cooled condenser is connected in fluid communication with said compressor by a non-insulated fluid bus.

60. The cooling system of claim 54, further comprising a heat exchanger receiving cooled intermediate working fluid from said liquid cooled condenser and connected between said evaporator and said compressor for cooling said intermediate working fluid communicated from said evaporator to said compressor.

61. The cooling system of claim 54, further comprising a liquid control valve connected between said liquid cooled condenser and said evaporator for controlling flow of the intermediate working fluid to the evaporator.

62. The cooling system of claim 54, further comprising a filter connected between said liquid cooled condenser and said evaporator.

63. The cooling system of claim 54, further comprising an expansion valve connected between said liquid cooled condenser and said evaporator.

64. The cooling system of claim 54, further comprising a solenoid valve connected between said liquid cooled condenser and said evaporator.

65. The cooling system of claim 54, wherein said at least one liquid condensing chiller subsystem comprises a plurality of liquid condensing chiller subsystems remotely located with respect to said at least one galley cooling unit, wherein said intermediate working fluid is in thermal communication with each of said plurality of condensing chiller subsystems.

66. The cooling system of claim 54, wherein said at least one liquid condensing chiller subsystem comprises a chiller liquid pump connected in fluid communication between said liquid cooled condenser and said at least one heat expelling heat exchanger for recirculating said chiller liquid from said heat expelling heat exchanger to said liquid cooled condenser.

67. The cooling system of claim 66, wherein said at least one liquid condensing chiller subsystem includes a controller unit operatively connected to said chiller liquid pump for controlling the operation of said chiller liquid pump.

68. The cooling system of claim 67, further comprising at least one temperature sensor connected to said controller unit and associated with said heat expelling heat exchanger for sensing the temperature of said heat expelling heat exchanger.

69. The cooling system of claim 67, further comprising at least one temperature sensor connected to said controller unit and associated with said intermediate fluid downstream from said evaporator for sensing the temperature of said intermediate fluid downstream from said evaporator.

70. The cooling system of claim 54, wherein said chiller liquid is water.

71. The cooling system of claim 54, wherein said chiller liquid is a mixture of water and glycol.

72. The cooling system of claim 54, further comprising a fan associated for drawing ambient air across said at least one heat expelling heat exchanger for cooling said at least one heat expelling heat exchanger.

* * * * *